US00RE39555E

(19) United States
(12) Reissued Patent
Stahl

(10) Patent Number: US RE39,555 E
(45) Date of Reissued Patent: Apr. 10, 2007

(54) COVER SHEET FOR IMPRESSING PATTERN ON EMBLEM

(75) Inventor: Brett A. Stahl, Harrison Township, MI (US)

(73) Assignee: Stahls' Inc., St. Clair Shores, MI (US)

(21) Appl. No.: 09/853,382

(22) Filed: May 11, 2001

Related U.S. Patent Documents

Reissue of:
(64) Patent No.: 5,902,667
Issued: May 11, 1999
Appl. No.: 08/595,639
Filed: Feb. 2, 1996

(51) Int. Cl.
*B32B 3/00* (2006.01)

(52) U.S. Cl. ..... 428/195.1; 156/60; 156/304.6; 156/306.3; 264/220; 264/293; 428/411.1; 428/423.1; 428/425.1; 428/447; 428/448.1; 428/537.5; 428/913

(58) Field of Classification Search ..... 156/60, 156/212, 304.6, 306.3; 264/219–227, 293, 264/337, 338; 428/195.1, 204, 411.1, 423.1, 428/425.1, 447, 488.1, 488.4, 537.5, 913
See application file for complete search history.

(56) References Cited

U.S. PATENT DOCUMENTS 3,657,060 A * 4/1972 Haigh
4,140,563 A * 2/1979 Sernaker
4,367,110 A * 1/1983 Yoshikawa ..... 156/219
4,396,448 A * 8/1983 Ohta et al. ..... 156/219
4,404,249 A * 9/1983 Margerum et al.
4,579,708 A * 4/1986 Rosart ..... 264/227
4,581,278 A * 4/1986 Margerum et al.
4,767,647 A * 8/1988 Bree
5,143,672 A * 9/1992 Kuwahara
5,298,031 A * 3/1994 Gabay et al.
5,312,645 A * 5/1994 Dressler
5,322,583 A * 6/1994 Wharton
5,405,675 A * 4/1995 Sawka et al.
5,411,783 A * 5/1995 Mahn, Jr.
5,464,690 A * 11/1995 Boswell
5,537,939 A * 7/1996 Horton
5,624,076 A * 4/1997 Miekka et al.

* cited by examiner

*Primary Examiner*—Bruce H. Hess
(74) *Attorney, Agent, or Firm*—Rader, Fishman & Grauer, PLLC

(57) ABSTRACT

An impressed emblem is disclosed which includes a cover sheet which is used together with heat and pressure to impress a desired pattern on an emblem. The emblem can also be impressed with a pattern and simultaneously heat-sealed onto a desired substrate.

12 Claims, 3 Drawing Sheets

COVER SHEET FOR IMPRESSING PATTERN ON EMBLEM

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,902,667. The reissue applications are application Ser. Nos. 09/853,382 (the present application) and 10/122,292, all of which are divisional reissues of U.S. Pat. No. 5,902,667.*

*The present application is a reissue of U.S. Pat. No. 5,902,667, issued on May 11, 1999.*

FIELD OF INVENTION

The present invention relates to an engraved cover sheet which when placed in mating engagement with an emblem, in the presence of heat and pressure, causes the impression on the cover sheet to be impressed on the emblem. The present invention further relates to a method for impressing a desired pattern on an emblem.

BACKGROUND ART

Emblems have been widely used to apply a variety of designs, patterns, numerals, names and logos onto many different types of substrates. Emblems have found particular use on sports jerseys, jackets and the like. Design emblems incorporating trademark indicia or licensed characters have also become increasingly popular.

To add to the design characteristics or trademark indicia of an emblem, prior art techniques have disclosed methods for embossing a desired lettering or design pattern onto an emblem.

U.S. Pat. No. 5,322,783 discloses a method for heat-embossing a synthetic woven material by use of a heat-resistant distortable intermediate material between the heat-embossing die and the target material that is subject to high adhesive properties when melted during the embossing process.

U.S. Pat. No. 5,298,031 relates to a method for embossing and decorating a thermoplastic velvet-like fabric. In the '031 patent, a transfer sheet supporting a thermally-activated decoration is simultaneously passed with a fabric between two rolls which are under pressure with respect to each other. At least one of the rolls is engraved so as to cause embossing of the fabric. The passing of the fabric and transfer sheet between the rolls is carried out at a temperature sufficient to activate the decoration and allow the transfer of the decoration to the embossed portions of the fabric.

U.S. Pat. No. 4,581,278 directed to thermo-imprinting of one or more surfaces, uses a heat-transfer cover and a release layer pigmented, low molecular weight polyolefin. The imprint is made by bringing the transfer layer into contact with the surface of an object while applying heat.

One significant problem with the prior art methods for emblem impressing is that such methods require tooling a die with the desired impression and then impressing the emblem with the die. For each individual pattern that is desired, a separate die must then be manufactured that is configured in the shape of the desired impression or design. Such a method of impressing an emblem is both time consuming and very expensive. Moreover, since a die must be re-tooled for each new design or logo, this embossing technique can only be utilized for large scale production. In many instances, smaller custom orders for impressed emblems would not be able to afford the cost associated with custom tooling a die.

Accordingly, it is an object of this invention to facilitate the production and use of impressed emblems. A related object is to reduce the cost of producing suitable impressed emblems and reduce the amount of materials required in conjunction with this method.

An additional object of the present invention is the provision of a method for simultaneously impressing an emblem with a desired pattern, and heat-fusing the emblem in position on the surface of a substrate, wherein the method utilizes conventional apparatus and is relatively simple and cost-effective.

Another object of the present invention is to provide a method of impressing an emblem without impairing or damaging the underlying substrate.

One more object of this invention is to facilitate marking fabrics with trademark indicia in a manner that is aesthetically pleasing and cost effective.

A final object of the present invention is to produce an impressed emblem without requiring the expensive step of tooling a die to serve as the transfer technique for the impressed pattern.

In carrying out the above objects of the invention, a cover sheet for impressing a pattern on the surface of an emblem is disclosed which includes a cover sheet having a base layer and a release coating thereon, wherein the release coating exhibits an impression complementing the desired pattern, such that when the coating is placed in registry with an emblem and heat and pressure are applied on the cover sheet toward the emblem, the desired pattern is formed on the emblem.

This invention further provides an impressed emblem including an emblem having an upper thermoplastic layer and a lower adhesive layer; a cover sheet having a base layer and a release coating thereon, wherein the coating exhibits an impression complementing the desired pattern; and the upper thermoplastic layer and the release coating being placed into mating engagement with one another such that upon the application of heat and pressure on the cover sheet and toward the emblem, the upper thermoplastic layer is impressed with the desired pattern.

The present invention further discloses a method of impressing a desired pattern to an emblem and a method for impressing a desired pattern to an emblem during simultaneous attachment of the emblem to a substrate. In a preferred embodiment the surface of the emblem is embossed or debossed slightly to form indicia, such as a trademark or the like, which is legible within about four feet of a viewer, but not substantially therebeyond. This enables a sports numeral, for example, appearing on a sports jersey to be identified with a trademark or other message which does not detract from the principle identifying function of the numeral.

This thermal impressing method preferably utilizes a cover sheet, the cover sheet is made up of a base layer with a release coating applied thereon. The cover sheet has an impression complementing the desired pattern. The impression can consist of raised surfaces or engraved, grooved or rigid surfaces. To create the impressed emblem, the release coating is matingly applied to the emblem, such that, upon application of heat and pressure on the cover sheet and toward the emblem, the emblem becomes impressed with the desired pattern. In one embodiment, the same application of heat and pressure used to bring about the impressing, is simultaneously used to adhere the emblem onto a desired substrate. With this method, the emblem is impressed and adhered to an underlying substrate, in one step.

BEST MODE FOR CARRYING OUT THE INVENTION

The present invention eliminates the expensive production of patterned and three-dimensional emblems and converts a formerly complex, multi-step process into a few simple steps whereby an emblem can be adhered onto a substrate and, at the same time, the emblem may be impressed with a desired pattern.

The term "impress" as used throughout the specification is defined hereinafter as the act of producing a mark formed by or as if by pressure. The term "impression" as used in the specification is defined as the effect produced by impressing. The term "impressed" or "impress" is thus defined so as to include the production of raised marks such as bosses and engraved marks such as ridges and grooves. Accordingly, an impression is intended to include both raised markings, embossed markings above the surface, and engraved or debossed ridges or grooves made below the surface. Furthermore, the term "complement" or any variation thereof such as "complementary," "complementing," or "complemental" is defined as one of two mutually completing parts.

Figure 1:
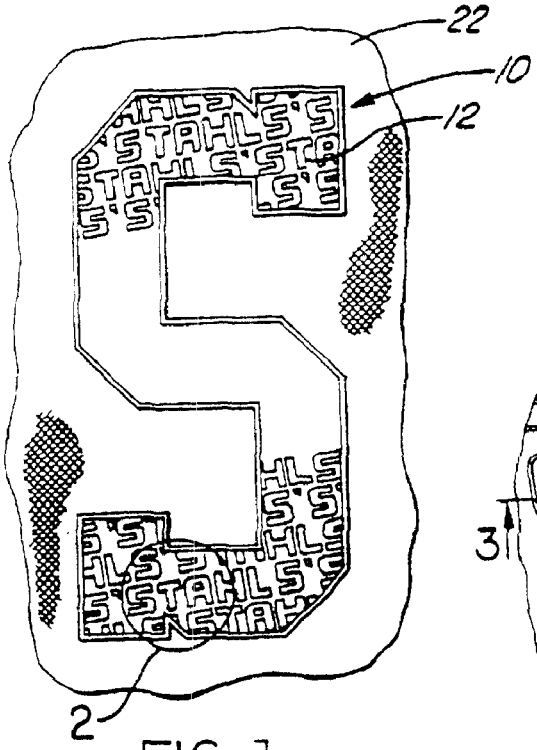
FIG. 1 is a perspective view of an impressed emblem applied to a substrate.
Figure 2:
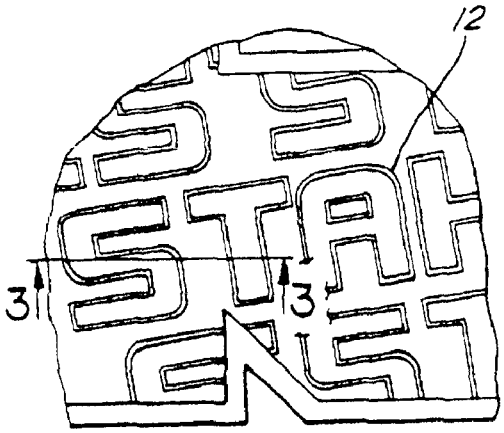
FIG. 2 is an enlarged view of the impressed lettering of FIG. 1 taken at the circular area 2 of FIG. 1.

FIG. 1 illustrates one example of an impressed emblem 10. The impressed lettering pattern 12 depicted in FIG. 1 is but one example of the many designs, numerals, logos and other indicia which may be impressed on an emblem. In the illustrated example, the impressed lettering pattern 12 serves as an aesthetically pleasing trademark identifier. Similarly, it is contemplated that sports garments, in particular, sports jerseys can be impressed with the NFL or NBA logos to function as a means for trademark identification in other instances, the impressing can constitute a desired design pattern. FIG. 2 shows an enlarged version of the impressed lettering pattern 12 on the emblem.

In a preferred embodiment, the lettering pattern 12 will be only faintly or slightly legible, for example, at not more than about four feet from the viewer. Thus, the pattern 12 will not detract from the principal identifying function of the emblem.

Figure 3:
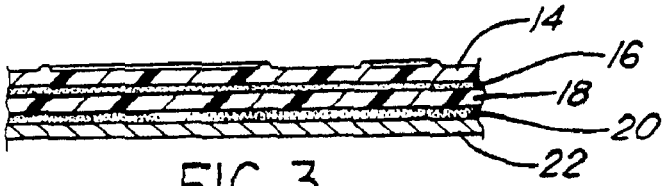
FIG. 3 is a cross-sectional view taken on the line 3—3 of FIG. 2, showing the raised, impressed markings or desired pattern on the emblem.
Figure 4:
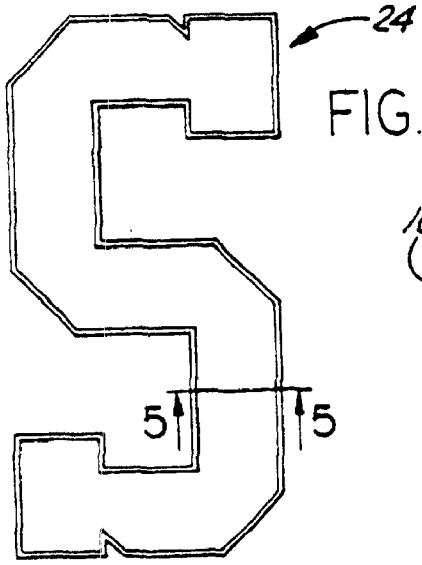
FIG. 4 is a perspective view of a multi-colored emblem without any impressed markings or desired pattern.
Figure 5:
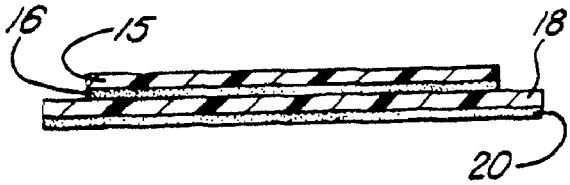
FIG. 5 is a cross-sectional view taken on the line 5—5 of FIG. 4.

As shown in FIG. 3, the impressed emblem 10 of the present invention includes an upper thermoplastic layer 14, an upper adhesive layer 16, a lower thermoplastic layer 18, a lower adhesive layer 20 and the substrate 22 on which the impressed emblem 10 is adhered, as shown in FIG. 1. While FIGS. 1–5 depict an emblem having an upper and lower thermoplastic layer 14, 18 and an upper and lower adhesive layer 16, 20, this invention is not limited in any way to the depicted emblem. On the contrary, the emblem shown in FIGS. 4 and 5, is simply one way to assemble a multi-layered emblem where the lower thermoplastic layer 18' is cut to the same shape but a larger size than the upper thermoplastic layer 14' such that when the two thermoplastic layers are placed one on top of another, the lower thermoplastic layer 18' extends beyond the periphery of the upper thermoplastic layer 14' and serves as an outline. The emblem can also be a simple structure having an upper thermoplastic layer with a lower adhesive layer thereon. Any such variation of an emblem is suitable for purposes of impressing a pattern thereon. The upper and lower thermoplastic layers 14, 18 or 14', 18' are preferably one of the following: polyurethane, polyester, polyamide, EVA, thermoplastic styrene butadiene, rubber, and blends thereof. The lower and upper adhesive layers are preferably either a polyester, polyurethane, or polyamide adhesive or blends thereof.

FIG. 3 further illustrates one possible impressed emblem. FIG. 3 shows an emblem having raised or embossed markings on the upper thermoplastic layer 14. Again, the present invention includes impressed emblems, both embossed or raised emblems and debossed emblems having markings below the surface.

FIGS. 4 and 5 further depict the differences between an emblem 24 before impressing and an impressed emblem 10. As shown in FIG. 5, the upper thermoplastic layer 14' of the emblem before impressing has a substantially flat surface when compared to the upper thermoplastic layer 14 of the impressed emblem 10, the impressions thereon are readily detectable. FIGS. 4 and 5 also illustrate the emblem itself, in contrast to FIGS. 1–3 which show the emblem 10 on a substrate 22.

Figure 6:
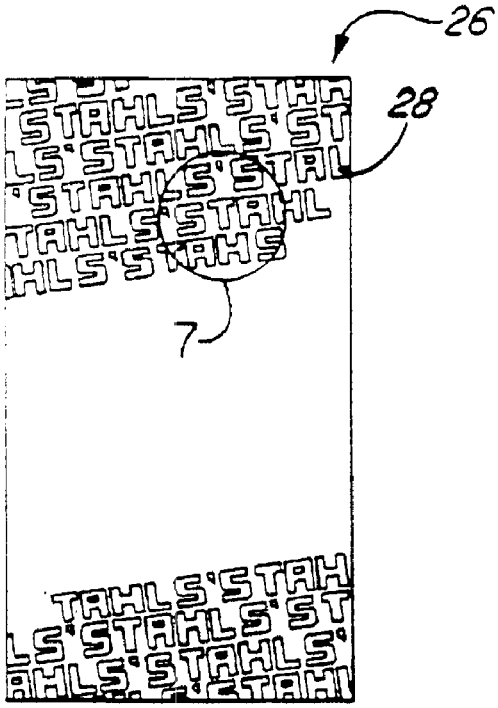
FIG. 6 is a perspective view of a cover sheet.
Figure 7:
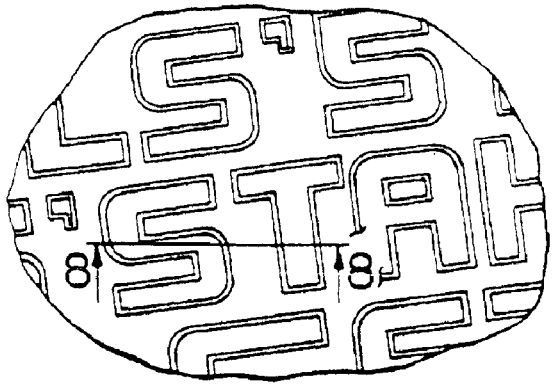
FIG. 7 is an enlarged view of the cover sheet of Figure taken at the circular area 7 of FIG. 6.

FIG. 6 depicts the impressed cover sheet 26 which is used to create an impressed emblem, as shown in FIG. 1. The cover sheet 26 can be either engraved or embossed depending on the emblem impression that is desired. If an embossed emblem is desired, a complementary engraved pattern is etched into the cover sheet. Likewise, if an emblem is desired with a grooved ridged pattern, the cover sheet 26 is embossed with the complementing pattern. The cover sheet may be impressed with any desired logo, lettering or design. One example is the engraved Stahls' lettering pattern 28, depicted in FIG. 6. With the use of a laser-cutting device or a precision knife, intricate patterns may be engraved into the cover sheet 26 for subsequent embossing on an emblem. With the use of a stamp, the cover sheet 26 can be embossed with raised markings in a desired pattern. FIG. 7 further depicts an enlarged view of a letter pattern 12 which can be impressed on the cover sheet 26.

Figure 8:
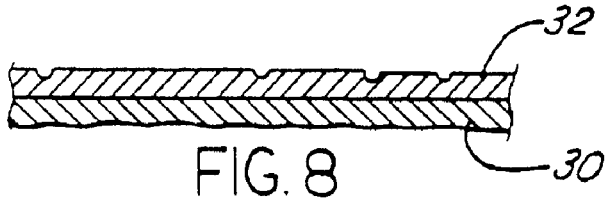
FIG. 8 is a cross-sectional view taken on line 8—8 of FIG. 7, showing the indentations on the release coating.

The engraved cover sheet 26, a cross-section of which is depicted in FIG. 8, comprises a base layer 30 with a release coating 32 applied to the base layer 30. As can be seen in FIG. 8, the indentations 33 that are made during the impressing process are confined to the release coating 32 so that the base layer 30 is left intact and can be used as a support means for the release coating 32. Accordingly, if the cover sheet 26 is to be engraved, the engraving must be adjusted so as not to cut deeper than the thickness of the release coating 32. The base layer 30 of the cover sheet 26 is preferably paper, fabric or plastic. However, if plastic is used as the base layer 30, the plastic must have a melting point that is sufficiently high so that during the impressing and heat-sealing processes, the base layer 30 remains intact. The base layer 30 is most preferably paper. In a preferred embodiment, the release coating 32 can be silicone, vinyl, Thermofilm®, or any polyurethane. Thermofilm® is a registered product of Stahls' Inc. Thermofilm® is a two-layer product wherein the first layer is urethane pigment layer having a polyester adhesive layer coated thereon.

Figure 9:
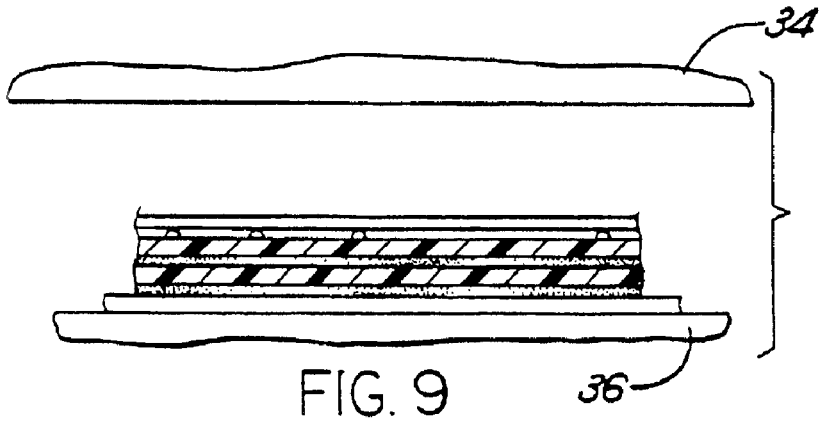
FIG. 9 is a side view of the platens positioned for placement of the emblem in mating engagement with the cover sheet.
Figure 10:
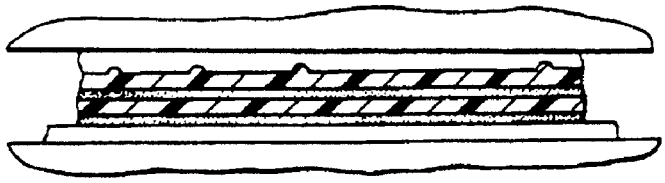
FIG. 10 is a side view of the platens in operative position to apply heat and pressure and effectuate emblem impressing and emblem attachment onto the substrate.

FIG. 9 depicts one method disclosed in this application, wherein an emblem can be impressed with a desired pattern and simultaneously attached on a substrate. One particular feature of the method resides in the step of simultaneously impressing the upper thermoplastic layer 14 of the emblem 24 while attaching the emblem 24 to the underlying substrate 22 using heat and pressure. To effectuate the attachment process, as depicted in FIG. 9, heat and pressure are applied using conventional sealing machines. As shown in FIG. 9, with the use of a heat-sealing device 37 having an upper platen 34 and a lower platen 36 with the ability to controllably release heat and apply pressure, a substrate 22, the emblem 24 and an impressed cover sheet 26 can be placed one on top of the other. More specifically, as shown in FIG. 9, on a lower platen 36, there is placed the desired substrate 22, followed by the emblem 24. The emblem 24 is placed on the substrate 22 in a position such that the lower adhesive layer 20, as depicted in FIG. 5, is in mating contact with the substrate 22. Furthermore, the emblem 24 is placed so that the upper thermoplastic layer 15 is exposed. Following this placement, the impressed cover sheet 26 is superimposed on the emblem 24. The impressed cover sheet 26 is superimposed such that the release coating 32 is in mating contact with the upper thermoplastic layer 14 of the emblem 24. It then follows that the base layer 30 of the cover sheet 26 is the layer that comes into contact with the upper platen 34 when the upper and lower platens 34, 36 are placed in an operative position, as shown in FIG. 10. The upper and lower platens 34, 36 are placed in an operative position for a time sufficient to bring the lower adhesive layer 20 to its melting temperature so that the adhesive can adhere to the underlying substrate 22. The upper and lower platens 34, 36 are further placed in operative position for a time sufficient to impress the upper thermoplastic layer 14 with the complement of the desired pattern 28 on the cover sheet 26. Accordingly, the upper and lower platens 34, 36 deliver heat and pressure toward the emblem and the substrate sufficient for the emblem 24 to adhere to the underlying substrate 22 and simultaneously have the cover sheet 26 impress the upper thermoplastic layer 15 of the emblem 24 with the desired pattern 22 on the surface.

In another embodiment of this invention, a method for impressing a desired pattern on an emblem without at the same time adhering the emblem to a substrate is disclosed. For this method, the emblem further requires the use of a carrier sheet to protect the lower adhesion layer 20 of the emblem both prior to, during and following the process of impressing the emblem. The carrier sheet is preferably a releasable sheet which is made of paper, fabric or plastic. If the carrier sheet is made of plastic then the plastic must have a higher melting point than the temperature required to impress the emblem. For such a method, again the impressed cover sheet 26 would be placed in mating engagement with the upper thermoplastic layer 14 of the emblem 24. Furthermore, the combination of the impressed cover sheet 26 placed together with the emblem assembly 24 would be sandwiched between the platens 34, 36 for the application of heat and pressure necessary to effectuate the impressing process on the emblem.

Figure 11:
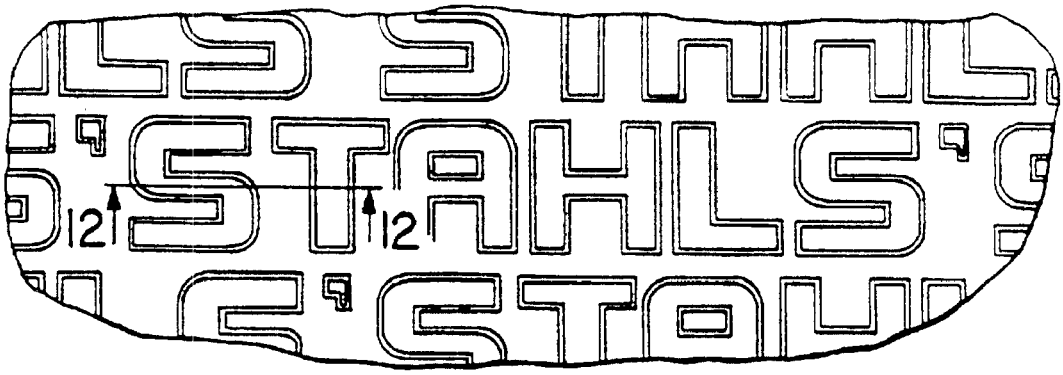
FIG. 11 is a perspective view of an impressed emblem.
Figure 12:
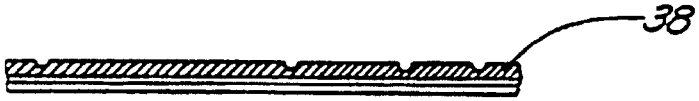
FIG. 12 is a cross-sectional view taken along lines 12—12 of FIG. 11 showing the indentations of the fabric layer.

In yet another embodiment of this invention, a laser-cutting device or a precision knife can be used to directly engrave or etch the fabric layer of an emblem. As depicted in FIG. 11, the Stahls' lettering pattern 12 may be etched into the fabric layer 38 of an emblem. As shown in FIG. 12, with this technique, the fabric layer 40 is itself debossed with indentations that constitute the desired pattern.

Suitable substrates 22 on which the emblem 10 can be applied include materials such as twill, cotton, wools, polyester and synthetic materials, such as [Gortex and Lycra] *GORTEX® AND LYCRA® synthetic materials*.

While the best mode for carrying out the invention has been described in detail, those familiar with the art to which this invention relates will recognize various alternative designs and embodiments for practicing the invention as defined by the following claims.

What is claimed is:

1. A cover sheet for impressing a pattern on a thermoplastic surface of an emblem, comprising:

a base layer *selected from the group consisting of paper, fabric, and plastic*;

a heat application release coating on the base layer;

said release coating exhibiting a heat resistant and pressure resistant debossed or embossed impression complementing the pattern; and said cover sheet, when placed with its release coating against and in registry with the thermoplastic surface of an emblem and heat and pressure are applied on said cover sheet and toward the emblem, the pattern is formed on the thermoplastic surface of the emblem.

[2. The cover sheet in claim 1 wherein said base layer is selected from the group consisting of paper, fabric and plastic.]

3. The cover sheet in claim 1 wherein said coating is selected from the group consisting of silicone, vinyl and urethane.

4. The cover sheet in claim 1 wherein said coating exhibits an engraved impression formed by using a laser cutter or a precision knife.

5. The cover sheet in claim 1, wherein said coating exhibits an impression formed by stamping to boss the complemental pattern on said coating.

6. A cover sheet combination for impressing a pattern on the surface of an emblem while affixing it to a substrate, comprising:

a cover sheet having a base layer and a release coating on one face thereof;

an emblem having an upper thermoplastic layer and a lower adhesive layer;

said release coating having an impression complementing the pattern;

said emblem being positioned on the substrate in a location such that said upper thermoplastic layer is exposed;

said cover sheet being superimposed on said emblem such that said release coating is in mating engagement with said upper thermoplastic layer;

said cover sheet being heated and pressed toward the substrate and against said emblem to affix said emblem to the substrate and form the desired pattern on the emblem.

*7. A cover sheet for impressing a pattern on a thermoplastic surface of an emblem, comprising:*

*a base sheet selected from the group consisting of paper, fabric, and plastic;*

*a non-thermoplastic heat application release coating on the base sheet;*

*said release coating exhibiting a heat resistant and pressure resistant debossed or embossed impression complementing the pattern; and*

*said cover sheet, when placed with its release coating against and in registry with the thermoplastic surface of an emblem and heat and pressure are applied on said cover sheet and toward the emblem, the pattern is formed on the thermoplastic surface of the emblem.*

*8. The cover sheet in claim 7 wherein said coating is selected from the group consisting of silicone, vinyl and urethane.*

*9. The cover sheet in claim 7 wherein said coating exhibits an engraved impression formed by using a laser cutter or a precision knife.*

*10. The cover sheet in claim 7, wherein said coating exhibits an impression formed by stamping to boss the complemental pattern on said coating.*

*11. A cover sheet for impressing a pattern on a thermoplastic surface of an emblem, comprising:*

*a base layer;*

*a heat application release coating on the base layer, wherein said release coating is selected from the group consisting of silicone, vinyl, and urethane;*

*said release coating exhibiting a heat resistant and pressure resistant debossed or embossed impression complementing the pattern; and*

*said cover sheet, when placed with its release coating against and in registry with the thermoplastic surface of an emblem and heat and pressure are applied on said cover sheet and toward the emblem, the pattern is formed on the thermoplastic surface of the emblem.*

*12. The cover sheet in claim 11 wherein said coating exhibits an engraved impression formed by using a laser cutter or a precision knife.*

*13. The cover sheet in claim 11 wherein said coating exhibits an impression formed by stamping to boss the complemental pattern on said coating.*

* * * * *